(12) United States Patent
Cihlar et al.

(10) Patent No.: US 9,546,600 B2
(45) Date of Patent: Jan. 17, 2017

(54) NOZZLE HAVING AN ORIFICE PLUG FOR A GAS TURBOMACHINE

(71) Applicant: General Electric Company, Schenectady, NY (US)

(72) Inventors: David William Cihlar, Greenville, SC (US); Zhaoli Hu, Greer, SC (US); Patrick Benedict Melton, Horse Shoe, NC (US); Kevin Woodlock, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 134 days.

(21) Appl. No.: 14/457,505

(22) Filed: Aug. 12, 2014

(65) Prior Publication Data

US 2016/0047314 A1 Feb. 18, 2016

(51) Int. Cl.
| | |
|---|---|
| F02C 7/22 | (2006.01) |
| F02C 7/232 | (2006.01) |
| F23R 3/28 | (2006.01) |
| F23R 3/14 | (2006.01) |
| F23R 3/26 | (2006.01) |
| F23R 3/34 | (2006.01) |
| F02C 3/04 | (2006.01) |
| F23K 5/14 | (2006.01) |

(52) U.S. Cl.
CPC . *F02C 7/22* (2013.01); *F02C 3/04* (2013.01); *F02C 7/222* (2013.01); *F02C 7/232* (2013.01); *F23K 5/14* (2013.01); *F23R 3/14* (2013.01); *F23R 3/28* (2013.01); *F23R 3/286* (2013.01); *F23R 3/343* (2013.01)

(58) Field of Classification Search
CPC ............. F23R 3/14; F23R 3/286; F23R 3/343; F23R 3/28; F02C 7/222; F02C 7/232
See application file for complete search history.

(56) References Cited

U.S. PATENT DOCUMENTS

| 3,763,650 A * | 10/1973 | Hussey | F23D 11/104 239/561 |
|---|---|---|---|
| 5,211,004 A | 5/1993 | Black | |
| 5,417,054 A * | 5/1995 | Lee | F02B 77/04 239/406 |
| 2006/0000220 A1* | 1/2006 | Sattinger | F02C 7/222 60/776 |
| 2009/0211256 A1* | 8/2009 | Williams | F02C 7/222 60/739 |
| 2009/0255262 A1* | 10/2009 | McMasters | F23R 3/14 60/742 |
| 2009/0277176 A1* | 11/2009 | Caples | F02C 7/222 60/737 |
| 2012/0180488 A1* | 7/2012 | Bailey | F23K 5/14 60/739 |

(Continued)

*Primary Examiner* — Gerald L Sung
*Assistant Examiner* — William Breazeal
(74) *Attorney, Agent, or Firm* — Dority & Manning, PA

(57) ABSTRACT

A gas turbomachine nozzle includes a base portion having a first fluid inlet and a second fluid inlet, and an outlet portion having one or more outlets. A connection section fluidically connects the base portion and the outlet portion. An orifice plug is arranged in the base portion at the second fluid inlet. The orifice plug includes one or more openings fluidically connecting the second fluid inlet and the connection section.

12 Claims, 2 Drawing Sheets

(56) References Cited

U.S. PATENT DOCUMENTS

| | | | | |
|---|---|---|---|---|
| 2012/0304650 A1* | 12/2012 | Hernandez | ............... | F23R 3/14 60/737 |
| 2013/0125549 A1* | 5/2013 | Bailey | ...................... | F23R 3/10 60/737 |
| 2013/0126641 A1* | 5/2013 | Pfeffer | ................... | F02C 7/232 239/533.9 |

* cited by examiner

NOZZLE HAVING AN ORIFICE PLUG FOR A GAS TURBOMACHINE

BACKGROUND OF THE INVENTION

The subject matter disclosed herein relates to the art of turbomachines and, more particularly, to a nozzle having an orifice plug for a gas turbomachine.

Turbomachines typically include a compressor portion and a turbine portion. The compressor portion forms a compressed air stream that is introduced into the turbine portion. In a gas turbomachine, a portion of the compressed air stream mixes with products of combustion forming a hot gas stream that is introduced into the turbine portion through a transition piece. The products of combustion are developed in a combustion chamber of a combustor. In the combustor, fuel and air may be passed through a nozzle to form a combustible mixture. The combustible mixture is combusted to form the products of combustion.

The hot gas stream impacts turbomachine airfoils arranged in sequential stages along the hot gas path. The airfoils are generally connected to a wheel which, in turn, may be connected to a rotor. Typically, the rotor is operatively connected to a load. The hot gas stream imparts a force to the airfoils causing rotation. The rotation is transferred to the rotor. Thus, the turbine portion converts thermal energy from the hot gas stream into mechanical/rotational energy that is used to drive the load. The load may take on a variety of forms including a generator, a pump, an aircraft, a locomotive or the like.

BRIEF DESCRIPTION OF THE INVENTION

According to one aspect of an exemplary embodiment, a gas turbomachine nozzle includes a base portion having a first fluid inlet and a second fluid inlet, and an outlet portion having one or more outlets. A connection section fluidically connects the base portion and the outlet portion. An orifice plug is arranged in the base portion at the second fluid inlet. The orifice plug includes one or more openings fluidically connecting the second fluid inlet and the connection section.

According to another aspect an exemplary embodiment, a turbomachine includes a compressor portion, a turbine portion operatively linked to the compressor portion, and a combustor assembly fluidically connected to the compressor portion and the turbine portion. The combustor assembly includes at least one combustor having at least one nozzle. The at least one nozzle includes a base portion having a first fluid inlet and a second fluid inlet, an outlet portion having one or more outlets, a connection section fluidically connecting the base portion and the outlet portion, and an orifice plug arranged in the base portion at the second fluid inlet. The orifice plug includes one or more openings fluidically connecting the second fluid inlet and the connection section.

According to yet another aspect of an exemplary embodiment, a turbomachine system includes a compressor portion, a turbine portion operatively linked to the compressor portion, an inlet system fluidically connected to the compressor portion, a load operatively connected to one of the compressor portion and the turbine portion, and a combustor assembly fluidically connected to the compressor portion and the turbine portion. The combustor assembly includes at least one combustor having at least one nozzle. The at least one nozzle includes a base portion having a first fluid inlet, a second fluid inlet, an outlet portion having one or more outlets, a connection section fluidically connecting the base portion and the outlet portion, and an orifice plug arranged in the base portion at the second fluid inlet. The orifice plug includes one or more openings fluidically connecting the second fluid inlet and the connection section.

These and other advantages and features will become more apparent from the following description taken in conjunction with the drawings.

BRIEF DESCRIPTION OF DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
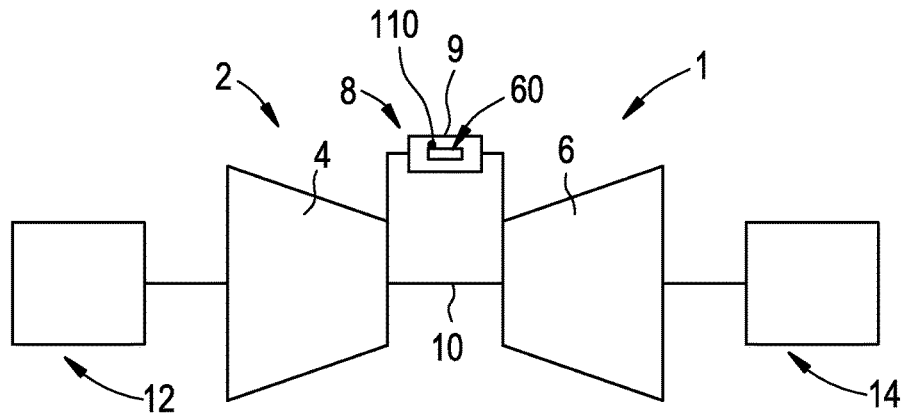
FIG. 1 is a schematic view of a turbomachine system including a combustor having a nozzle provided with an orifice plug, in accordance with an exemplary embodiment.
Figure 2:
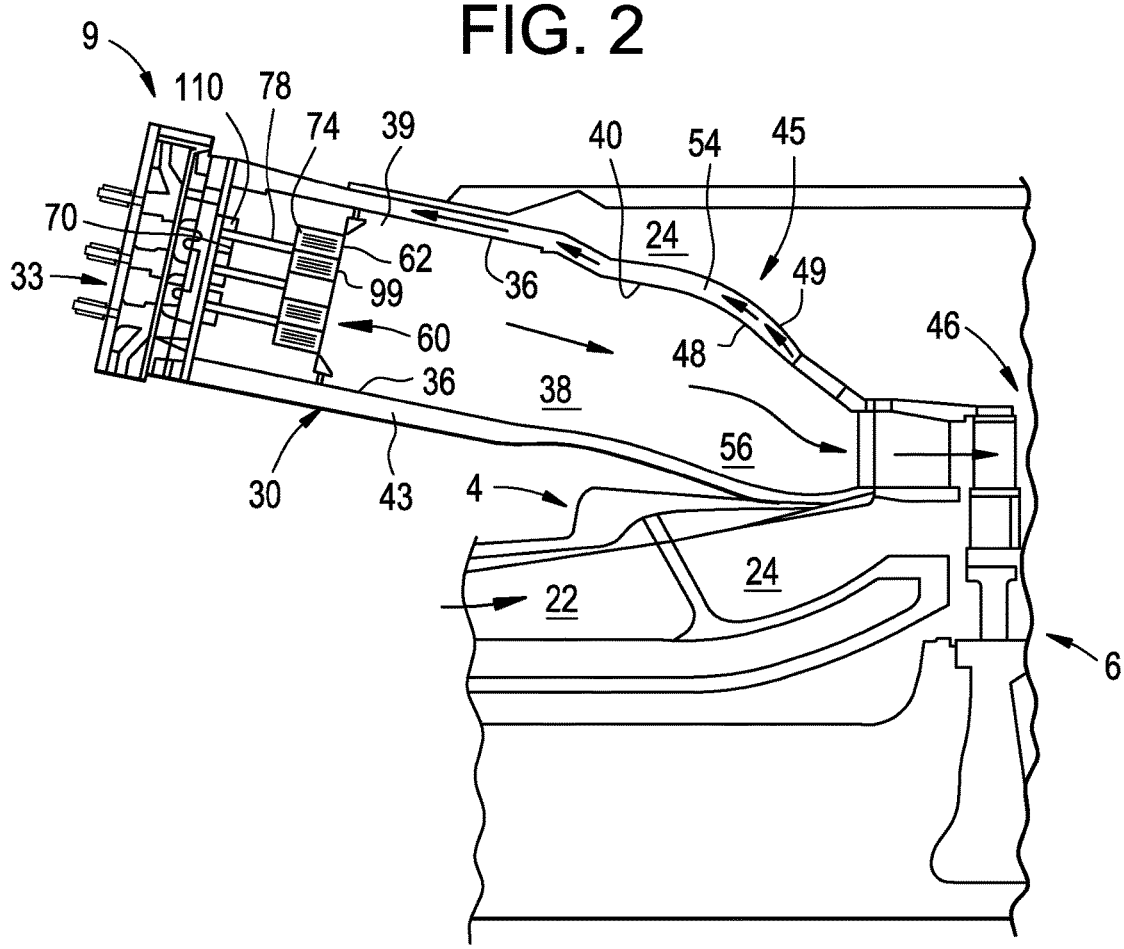
FIG. 2 is a partial cross-sectional view of the combustor and nozzle of FIG. 1.

With initial reference to FIGS. 1 and 2, a turbomachine system is indicated generally at 1. Turbomachine system 1 includes a turbomachine 2 having a compressor portion 4 connected to a turbine portion 6 through a combustor assembly 8 including at least one combustor 9. Compressor portion 4 is also connected to turbine portion 6 via a common compressor/turbine shaft 10. An air inlet system 12 is fluidically connected to an inlet (not separately labeled) of compressor portion 4. A load, indicated generally at 14, is operatively connected to turbine portion 6. Load 14 may take on a variety of forms including generators, pumps, locomotive systems, and other driven loads. Turbine portion 6 may also be connected to an exhaust system (not shown).

Compressor portion 4 includes a diffuser 22 and a compressor discharge plenum 24 that are coupled in fluidic communication with each other and combustor assembly 8. With this arrangement, compressed air is passed through diffuser 22 and compressor discharge plenum 24 into combustor assembly 8. The compressed air is mixed with fuel and combusted to form hot gases. The hot gases are channeled to turbine portion 6. Turbine portion 6 converts thermal energy from the hot gases into mechanical/rotational energy.

Combustor 9 includes a combustor body 30 having a combustor cap 33 and a combustor liner 36. As shown, combustor liner 36 is positioned radially inward from combustor body 30 so as to define a combustion chamber 38. Combustion chamber 38 extends from a head end 39 to a compressor discharge 40. Combustor liner 36 may be spaced from combustor body 30 forming a compressor discharge casing (CDC) airflow passage 43. A transition piece 45 connects combustor assembly 8 to turbine portion 6. Transition piece 45 channels combustion gases generated in combustion chamber 38 downstream towards a first stage 46 of turbine portion 6. Transition piece 45 may include an inner wall 48 and an outer wall 49 that define an annular passage 54 that fluidically connects with CDC airflow passage 43. Inner wall 48 may also define a guide cavity 56 that extends between combustion chamber 38 and turbine portion 6. A nozzle assembly 60 is arranged at head end 39 of combustor liner 36. Nozzle assembly 60 includes one or more nozzles, such as indicated at 62.

Figure 3:
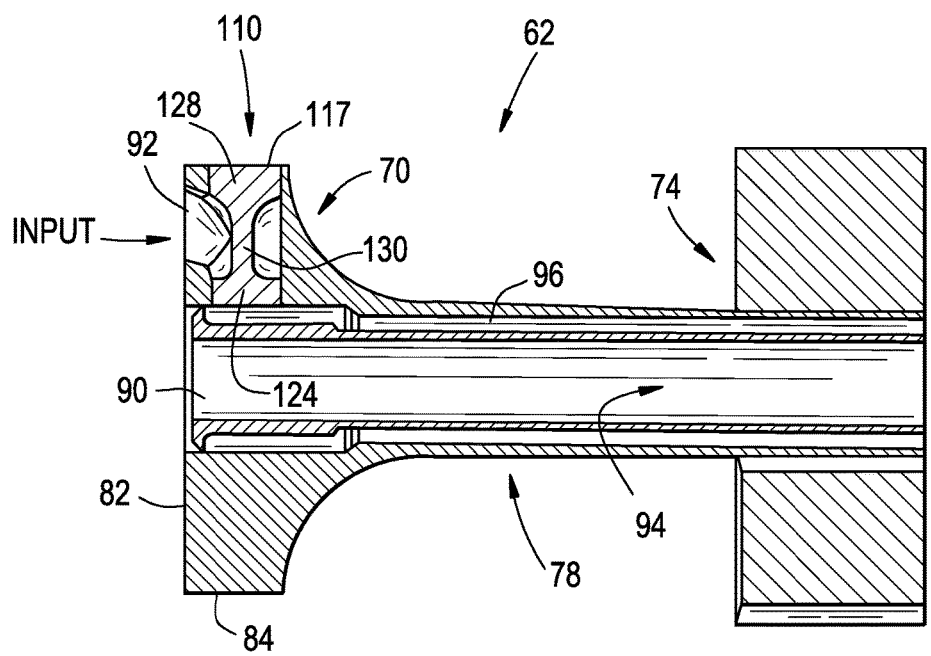
FIG. 3 is a partial cross-sectional view of the nozzle of FIG. 2.
Figure 4:
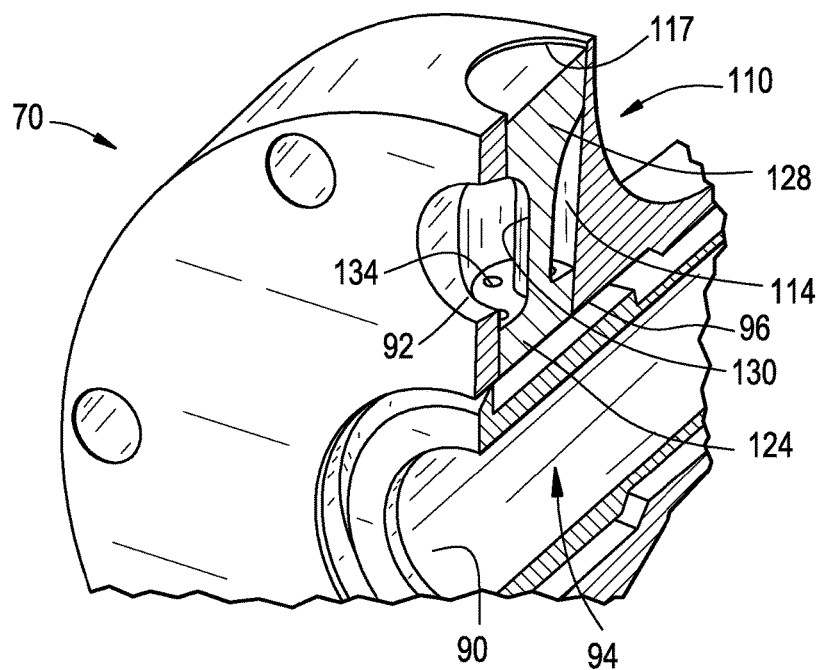
FIG. 4 is a partial perspective axially end cross-sectional view of the nozzle of FIG. 3.

As shown in FIG. 3, nozzle 62 includes a base portion 70 and an outlet portion 74 joined by a connection section 78. In accordance with an aspect of an exemplary embodiment, base portion 70 includes a base surface 82 defined by an outer, annular edge 84. Base surface 82 includes a first fluid inlet 90 and a second fluid inlet 92. First fluid inlet 90 fluidically connects to a first passage 94 that extends centrally from base portion 70 to outlet portion 74 through connection section 78. Second fluid inlet 92 fluidically connects with a second passage 96 that extends from base portion 70 to outlet portion 74 through connection section 78. Second passage 96 is arranged radially outwardly of first passage 94. First and second passages 94 and 96 lead to one or more outlets 99 (FIG. 2) formed in outlet portion 74. While shown as a flange, it should be understood that base portion 70 may be defined anywhere along nozzle 62 that may support second fluid inlet 92 and provide access to second passage 96.

In accordance with an exemplary embodiment, nozzle 62 includes an orifice plug 110 provided in an orifice plug receiving zone 114 formed in base portion 70. Orifice plug 110 may be secured in orifice plug receiving zone 114 through a variety of methods including brazing, welding, staking, press-fitting and the like. Orifice plug 110 is inserted into an opening 117 formed in outer, annular edge 84. Orifice plug 110 includes a base section 124 and a plug section 128 joined by an intermediate section 130. Base section 124 and plug section 128 may include a first dimension while intermediate section 130 includes a second dimension. The second dimension is less than the first dimension such as orifice plug 110 includes an hourglass shaped geometry. Base section 124 includes a plurality of metered openings 134 that deliver a fluid from second fluid inlet 92 into second passage 96. The fluid may mix with fluid passing through first passage 94 at outlet portion 74 and discharge into combustion chamber 38 to be combusted.

At this point, it should be understood that the exemplary embodiments describe an orifice plug that forms a secondary orifice for a turbomachine nozzle. Instead of being incorporated into an endcover, the orifice plug of the exemplary embodiments is integrated directly into the nozzle. More specifically, the orifice plug is integrated into a base portion of the nozzle. In this manner, the orifice plug does not limit fuel flow or provide additional obstructions as compared to endcover mounted orifice plugs. Further, integrating the orifice plug into the nozzle eliminates the need for separate flow testing of the endcover assembly and the nozzle assemblies. In addition, while shown as being mounted through an opening formed in an annular side wall of the base portion, the orifice plug may be mounted into the base portion through a variety of mechanisms. Further, it should be understood that while shown as having an hour-glass shape, orifice plug may include a variety of geometries depending upon installation and operational requirements. Still further, it should be understood that the orifice plug may be formed having a cylindrical, oval, teardrop or other shapes.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A nozzle for a gas turbine engine, comprising:
   a base portion including a first axial end of the nozzle;
   an outlet portion including a second axial end of the nozzle, wherein the second axial end is the axially opposite end of the nozzle relative to the first axial end;
   a connection section extending from the base portion to the outlet portion, wherein the connection section couples the base portion to the outlet portion;
   a first passage having a first inlet at the first axial end and a first passage outlet at the second axial end; and
   a second passage radially outward of the first passage, wherein the second passage is a fuel passage, the second passage having a second inlet at the first axial end, a second outlet at the second axial end, an aperture located in the base portion radially outward of the second inlet, and a base portion opening located in the base portion radially inward of the second inlet, wherein the first passage and the second passage extend through the base portion, the outlet portion, and the connection section;
   an orifice plug comprising:
      a plug section;
      a base section defining one or more base section openings extending therethrough; and
      an intermediate section located between the plug section and the base section, wherein the intermediate section couples the base section to the plug section, wherein the plug section is positioned in the aperture and the base section is positioned in the base portion opening.

2. The nozzle of claim 1, wherein the base portion comprises a base surface, and wherein the first inlet and the second inlet are defined by the base surface.

3. The nozzle of claim 1, wherein the plug section occludes the aperture.

4. The nozzle of claim 1, wherein the base section and the plug section comprise a first diameter and the intermediate section comprises a second diameter, and wherein the second diameter is smaller than the first diameter.

5. A gas turbine engine, comprising:
   a compressor portion;
   a turbine portion; and
   a combustor assembly comprising one or more nozzles, the one or more nozzles comprising:
   a base portion including a first axial end of the nozzle;
   an outlet portion including a second axial end of the nozzle, wherein the second axial end is the axially opposite end of the nozzle relative to the first axial end;
   a connection section extending from the base portion to the outlet portion, wherein the connection section couples the base portion to the outlet portion;
   a first passage having a first inlet at the first axial end and a first passage outlet at the second axial end; and
   a second passage radially outward of the first passage, wherein the second passage is a fuel passage, the second passage having a second inlet at the first axial end, a second outlet at the second axial end, an aperture located in the base portion radially outward of the second inlet, and a base portion opening located in the base portion radially inward of the second inlet, wherein the first passage and the second passage extend through the base portion, the outlet portion, and the connection section;

an orifice plug comprising:
  a plug section;
  a base section defining a plurality of base section openings extending therethrough; and
  an intermediate section located between the plug section and the base section, wherein the intermediate section couples the base section to the plug section, wherein the plug section is positioned in the aperture and the base section is positioned in the base portion opening.

6. The gas turbine engine of claim 5, wherein the base portion comprises a base surface, and wherein the first inlet and the second inlet are defined by the base surface.

7. The gas turbine engine of claim 5, wherein the plug section occludes the aperture.

8. The gas turbine engine of claim 5, wherein the base section and the plug section comprise a first diameter and the intermediate section comprises a second diameter, and wherein the second diameter is smaller than the first diameter.

9. A gas turbine engine system, comprising:
a compressor portion;
a turbine portion;
an inlet system;
a load coupled to the compressor portion or the turbine portion;
a combustor assembly comprising one or more nozzles, the one or more nozzles comprising:
a base portion including a first axial end of the nozzle;
an outlet portion including a second axial end of the nozzle, wherein the second axial end is the axially opposite end of the nozzle relative to the first axial end;
a connection section extending from the base portion to the outlet portion, wherein the connection section couples the base portion to the outlet portion;
a first passage having a first inlet at the first axial end and a first passage outlet at the second axial end; and
a second passage radially outward of the first passage, wherein the second passage is a fuel passage, the second passage having a second inlet at the first axial end, a second outlet at the second axial end, an aperture located in the base portion radially outward of the second inlet, and a base portion opening located in the base portion radially inward of the second inlet, wherein the first passage and the second passage extend through the base portion, the outlet portion, and the connection section;

an orifice plug comprising:
  a plug section;
  a base section defining a plurality of base section openings extending therethrough; and
  an intermediate section located between the plug section and the base section, wherein the intermediate section couples the base section to the plug section, wherein the plug section is positioned in the aperture and the base section is positioned in the base portion opening.

10. The gas turbine engine system of claim 9, wherein the base portion comprises a base surface, and wherein the first inlet and the second inlet are defined by the base surface.

11. The gas turbine engine system of claim 9, wherein the plug section occludes the aperture.

12. The gas turbine engine system of claim 9, wherein the base section and the plug section comprise a first diameter and the intermediate section comprises a second diameter, and wherein the second diameter is smaller than the first diameter.

* * * * *